United States Patent
Hanzawa et al.

(10) Patent No.: US 6,167,761 B1
(45) Date of Patent: Jan. 2, 2001

(54) CAPACITANCE TYPE PRESSURE SENSOR WITH CAPACITIVE ELEMENTS ACTUATED BY A DIAPHRAGM

(75) Inventors: Keiji Hanzawa, Mito; Akio Yasukawa, Kashiwa; Satoshi Shimada, Hitachi; Seikou Suzuki, Hitachiohta; Akihiko Saito; Masahiro Matsumoto, both of Hitachi; Atsushi Miyazaki; Norio Ichikawa, both of Mito; Junichi Horie; Seiji Kuryu, both of Hitachinaka, all of (JP)

(73) Assignee: Hitachi, Ltd. and Hitachi Car Engineering Co., Ltd. (JP)

( * ) Notice: Under 35 U.S.C. 154(b), the term of this patent shall be extended for 0 days.

(21) Appl. No.: 09/103,612

(22) Filed: Jun. 24, 1998

(51) Int. Cl.⁷ .................................................. G01L 9/12
(52) U.S. Cl. ............................ 73/724; 361/283.4; 438/53
(58) Field of Search ........................... 73/724; 361/283.4; 438/53

(56) References Cited

U.S. PATENT DOCUMENTS

| | | | |
|---|---|---|---|
| 4,570,498 | * 2/1986 | Okayama | 73/720 |
| 5,336,918 | * 8/1994 | Ipposhi et al. | 257/419 |
| 5,431,057 | * 7/1995 | Zimmer et al. | 73/724 |

* cited by examiner

Primary Examiner—Joseph L. Felber
(74) Attorney, Agent, or Firm—Evenson, McKeown, Edwards & Lenahan, P.L.L.C

(57) ABSTRACT

In a capacitance type pressure sensor, a diaphragm is formed of a fragile material using an impurity-diffused monocrystal silicon and constitutes a stable pressure-responsive structure which does not undergo a plastic deformation. Between the diaphragm and a movable electrode is formed an oxide film to diminish stray capacitance between the movable electrode and a substrate and also between the movable electrode and a impurity-diffused layer. The oxide film and the movable electrode are each divided into plural regions so that the divided regions of the movable electrode are formed on the divided regions of the oxide film, thereby diminishing stress strain induced by a difference in therm expansion coefficient among the diaphragm, oxide film and movable electrode. The upper surface of a fixed electrode is covered with a structure for the fixed electrode which structure is formed by an insulating polycrystal silicon film not doped with impurity whereby the rigidity of the electrode is enhanced and it is possible to diminish a leak current.

10 Claims, 16 Drawing Sheets

CAPACITANCE TYPE PRESSURE SENSOR WITH CAPACITIVE ELEMENTS ACTUATED BY A DIAPHRAGM

This application is related to U.S. Patent Application Ser. No. 09/103,534 filed Jun. 24, 1998.

BACKGROUND OF THE INVENTION

1. Field of the Invention

The present invention relates to a pressure sensor for detecting pressure, particularly a capacitance type pressure sensor for use in controlling an automotive engine and a method for manufacturing the same.

2. Prior Art

As a conventional capacitance type pressure sensor there is known, for example, the pressure sensor disclosed in Japanese Patent Publication No. Hei 7-50789. In this known capacitance type pressure sensor, a first electrode is formed by impurity diffusion on a monocrystal silicon substrate, and a second electrode is formed in the form of a diaphragm and in opposition to the first electrode through a gap with use of a polycrystal silicon which has been rendered electrically conductive.

According to the construction of the above capacitance type pressure sensor, when pressure is applied to the diaphragm-like second electrode, the second electrode is displaced by the applied pressure, and with this displacement of the second electrode, the capacitance between the first and second electrodes changes, which change in the capacitance is detected to detect the pressure.

In the prior art described above, however, since the first electrode is formed by diffusion, the junction capacitance with the silicon substrate is very large, resulting in increase in the stray capacitance between the first and second electrodes. Therefore, the pressure detecting accuracy is low and it has so far been impossible to perform a high-accuracy pressure detection.

Besides, the second electrode comes into direct contact with air which is a medium to be measured, so if foul air with gasoline, etc. incorporated therein contacts the second electrode, there occurs a leak current, making it difficult to effect an accurate detection of capacitance. Thus, it has so far been impossible to perform the pressure detection with a high accuracy.

Further, since the diaphragm which is displaced by pressure is formed using a polycrystal silicon, it is apt to undergo a plastic deformation and hence there has been the possibility that the correlation between applied pressure and the change in capacitance may vary. This gives rise to the problem that the pressure detecting accuracy and reliability are deteriorated.

SUMMARY OF THE INVENTION

It is an object of the present invention to provide a capacitance type pressure sensor capable of diminishing stray capacitance, suppressing plastic deformation of a diaphragm portion which undergoes pressure and further capable of effecting pressure detection with a high accuracy, as well as a method for manufacturing such a capacitance type pressure sensor.

(1) According to the present invention, in order to achieve the above-mentioned object, there is provided a capacitance type pressure sensor comprising a diaphragm which is a monocrystal silicon substrate and which is displaced by applied pressure, an insulating film formed on the diaphragm, a first electrode formed on the insulating film, a second electrode formed in opposition to the first electrode through a gap, and means for detecting a change in capacitance between the first and second electrodes and converting the detected capacitance change into a voltage, which capacitance change occurs due to a change in the distance between the first and second electrodes caused by the pressure applied to the diaphragm.

(2) Preferably, in the above (1), the insulating film is divided in at least two or more.

(3) Preferably, in the above (2), the first electrode is divided in at least two or more.

(4) Preferably, in the above (3), the area of the first electrode is smaller than the area of the insulating film.

(5) Preferably, in the above (1) to (4), a hollow portion is present partially between the first electrode and the silicon substrate.

(6) Preferably, in the above (1) to (5), the first electrode is formed by a polycrystal silicon.

(7) Preferably, in the above (1) to (6), the pressure sensor is made integral with a signal processing circuit for processing a signal provided from the pressure sensor, and the material of a gate electrode of a MOS transistor included in the signal processing circuit is the same as the material of the first electrode.

Between the diaphragm and the first electrode is formed an insulating film to diminish the stray capacitance generated between the first electrode and the monocrystal silicon substrate, and also between the first electrode and impurity.

If the insulating film and the first electrode are divided minutely into a plurality of regions, it becomes possible to diminish a stress strain induced by a difference in thermal expansion coefficient among the diaphragm, insulating film and first electrode. That is, in the case where the first electrode and the insulating film are divided plurally, it is possible to diminish the stress strain induced by a difference in thermal expansion coefficient among them in comparison with the case where they are not divided plurally.

Where the first electrode in the pressure sensor is formed by a polycrystal silicon, the MOS transistor gate electrode in the signal processing circuit for processing a signal provided from the pressure sensor is also formed using the polycrystal silicon and hence the pressure sensor and the signal processing circuit can be made integral with each other.

(8) According to the present invention there also is provided a method for manufacturing the capacitance type pressure sensor, comprising the steps of doping an impurity into a monocrystal silicon substrate; forming an oxide film over a predetermined portion on the impurity; forming on the oxide film a polycrystal silicon film which has been rendered electrically conductive and which serves as a first electrode and subsequent patterning; forming a sacrificial layer on at least the first electrode and subsequent patterning; forming on at least the sacrificial layer a polycrystal silicon film which has been rendered electrically conductive and which serves as a second electrode; forming an insulated polycrystal silicon film on the second electrode and subsequent patterning; removing the sacrificial layer; forming a protective film on the insulated polycrystal silicon film; and etching a predetermined portion of the monocrystal silicon substrate on the side opposite to the impurity-doped side to form a diaphragm of the impurity.

In the case where the first electrode is formed by a polycrystal silicon and the MOS transistor gate electrode used in the signal processing circuit for processing a signal provided from the pressure sensor is also formed by the polycrytal silicon, it is possible to fabricate the pressure sensor and the signal processing circuit simultaneously in one piece with each other.

(9) According to the present invention there is further provided a capacitance type pressure sensor comprising a diaphragm which is a monocrystal silicon substrate and which is displaced by applied pressure, a first electrode formed on the diaphragm and divided in at least two or more, a second electrode formed in opposition to the first electrode through a gap, and means for detecting a change in capacitance between the first and second electrodes and converting the detected capacitance change into a voltage, which capacitance change occurs due to a change in the distance between the first and second electrodes caused by the pressure applied to the diaphragm.

(10) Preferably, in the above (9), the first electrode is formed by a polycrystal silicon.

(11) Preferably, in the above (9) or (10), the pressure sensor is made integral with a signal processing circuit for processing a signal provided from the pressure sensor, and the material of a gate electrode of a MOS transistor included in the signal processing circuit is the same as the material of the first electrode.

Since the first electrode is divided into plural regions, it is possible to diminish a stress strain induced by a difference in thermal expansion coefficient between the diaphragm and the first electrode.

(12) According to the present invention there is further provided a method for manufacturing the capacitance type pressure sensor, comprising the steps of doping an impurity into a monocrystal silicon substrate; forming over a predetermined portion on the impurity a polycrystal silicon film which has been rendered electrically conductive and which serves as a first electrode and subsequent patterning into a plurality of divided regions; forming a sacrificial layer on at least the first electrode and subsequent patterning; forming on at least the sacrificial layer a polycrystal silicon film which has been rendered electrically conductive and which serves as a second electrode; forming an insulated polycrystal silicon film on the second electrode and subsequent patterning; removing the sacrificial layer; forming a protective film on the insulated polycrystal silicon film; and etching a predetermined portion of the monocrystal silicon substrate on the side opposite to the impurity-doped side to form a diaphragm of the impurity.

In the case where the first electrode is formed by a polycrystal silicon and the MOS transistor gate electrode used in the signal processing circuit for processing a signal provided from the pressure sensor is also formed by the polycrystal silicon, it is possible to fabricate the pressure sensor and the signal processing circuit simultaneously in one piece with each other.

DETAILED DESCRIPTION OF THE INVENTION

Figure 1:
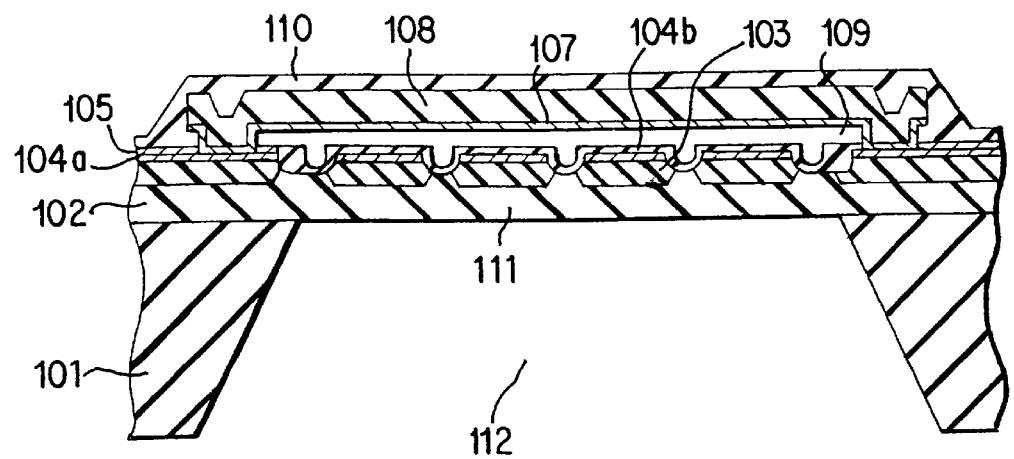
FIG. 1 is a sectional view of a capacitance type pressure sensor according to a first embodiment of the present invention.
Figure 2:
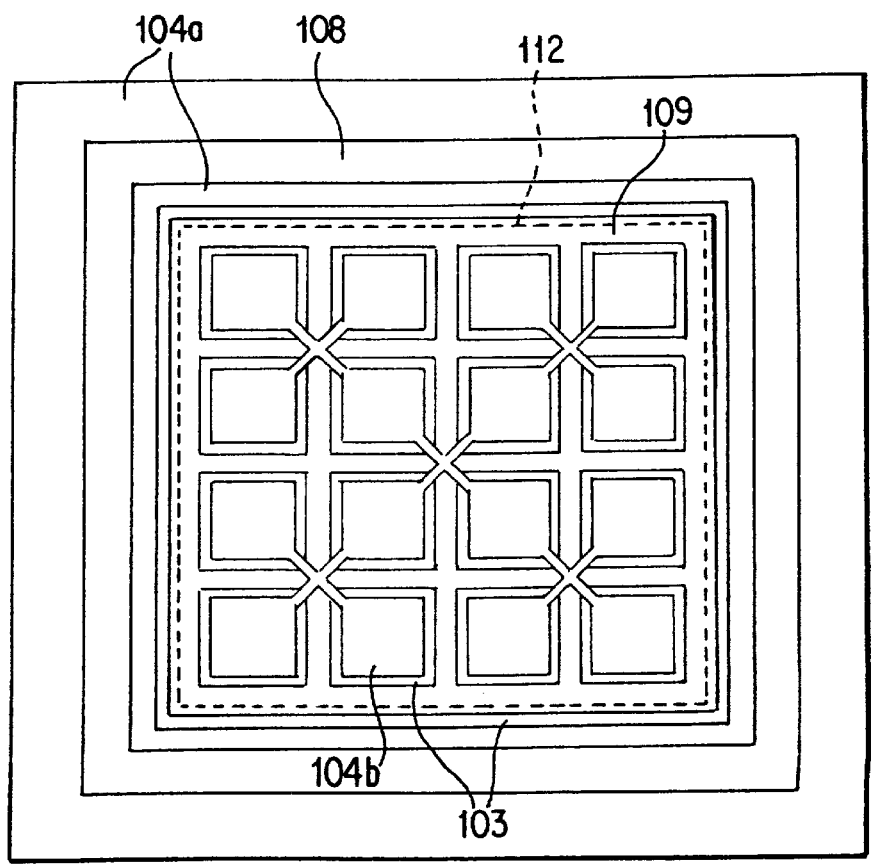
FIG. 2 is a plan view thereof.

FIG. 1 is a sectional view of a capacitance type pressure sensor according to the first embodiment of the present invention and FIG. 2 is a plan view thereof.

In FIGS. 1 and 2, the capacitance type pressure sensor of the first embodiment comprises a monocrystal silicon substrate 101, an impurity diffused layer 102, an oxide film layer (insulating film) 103, a fixed electrode wiring 104a, a movable electrode (first electrode) 104b, a protective film 105, a fixed electrode (second electrode) 107, a structure 108 for the fixed electrode, a gap 109, a protective film 110, a diaphragm 111, and a pressure inlet hole 112.

Air, which is a medium to be measured, is introduced into the pressure inlet hole 112. When the diaphragm 111 is pressurized with the air thus introduced into the pressure inlet hole 112, the diaphragm 111 is displaced in accordance with the magnitude of the pressure.

Upon displacement of the diaphragm 111, the gap 109 present between the movable electrode 104b formed on the diaphragm 111 and the fixed electrode 107 changes. That is, as the distance between the movable electrode 104b and the fixed electrode 107 changes, the capacitance formed between the two electrodes changes. By detecting this capacitance change it is made possible to effect the detection of pressure.

Since the diaphragm 111 is formed of a fragile material using an impurity-diffused monocrystal silicon, it does not undergo a plastic deformation but forms a highly reliable and stable pressure-responsive structure.

Between the diaphragm 111 and the movable electrode 104b is formed the oxide film 103 to diminish a stray capacitance generated between the movable electrode 104b and the substrate 101 and also between the movable electrode 104b and the impurity-diffused layer 102. As shown in the figures, the oxide film 103 is divided minutely into a plurality of regions (sixteen regions in this embodiment).

Like the oxide film 103, the movable electrode 104b is also divided minutely into plural regions which are electrically connected together. The plurally divided regions of the movable electrode 104b are formed on the divided regions of the oxide film 103.

With this arrangement, it is possible to diminish a stress strain induced by a difference in thermal expansion coefficient among the diaphragm 111, oxide film 103 and movable electrode 104 In case that the movable electrode 104b and the oxide film 103 are each divided into plural regions, it is advantageous in that the stress strain based on the mutual difference in thermal expansion coefficient can be diminished in comparison with the case where they are not plurally divided.

The upper surface of the fixed electrode 107 is covered with the structure 108 for the fixed electrode which structure is formed by an insulating polycrystal silicon film not doped with impurity, to enhance the rigidity of the fixed electrode 107. By covering the surface of the fixed electrode 107 completely with such an insulating material it is possible to diminish the leak current.

Thus, according to the capacitance type pressure sensor of the first embodiment of the present invention, the diaphragm 111 is formed by a fragile material using an impurity-diffused monocrystal silicon, the oxide film 103 is formed between the movable electrode 104b and the diaphragm 111, and the movable electrode 104b and the oxide film 103 are each divided into plural regions.

Further, the upper surface of the fixed electrode 107 is covered with the structure 108 for the fixed electrode which structure is formed by an insulating polycrystal silicon film not doped with impurity.

Therefore, the pressure-responsive structure is stable and is little deformed by a thermal strain, so that it is possible to realize a highly accurate and reliable capacitance type pressure sensor with little stray capacitance and little leak current.

Reference will be made below to a method for manufacturing the capacitance type pressure sensor of the first embodiment described above. FIGS. 3(a) to 3(c) to 6(j) to 6(k) illustrate various steps in the said manufacturing method.

Figure 3A:
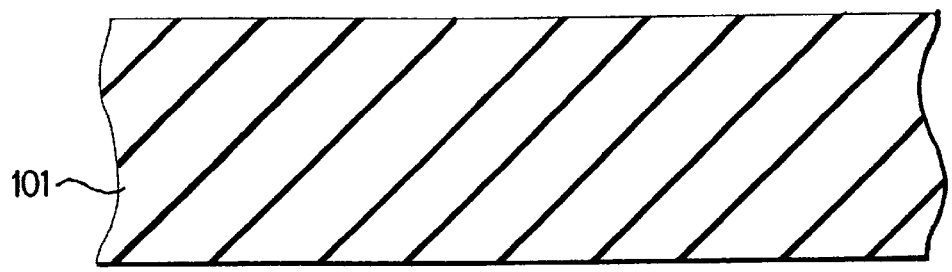
FIGS. 3(a) to 3(c) are diagrams explaining a method for manufacturing the capacitance type pressure sensor of the first embodiment.
Figure 3B:
Figure 3B:
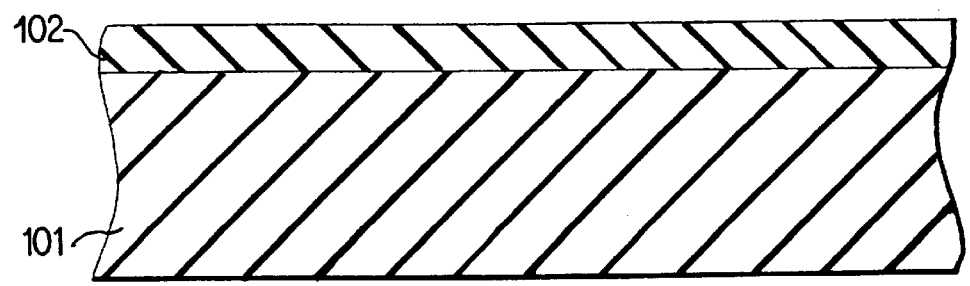
Figure 3C:
Figure 3C:
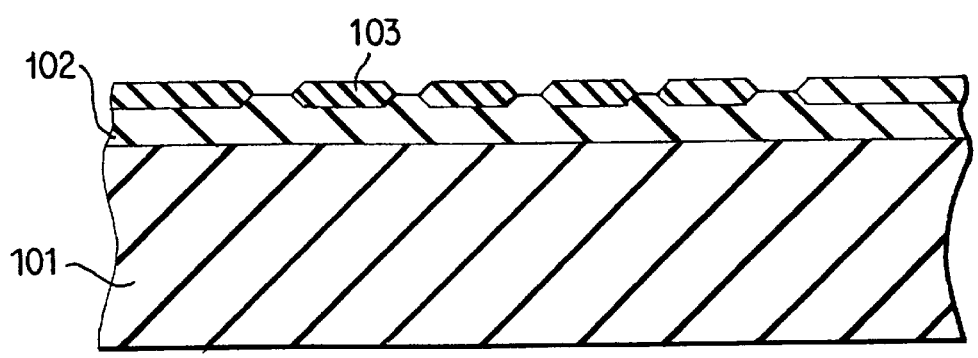

In FIGS. 3(a) to 3(c), an impurity-diffused layer 102, which is the same as that used in the formation of well for a CMOS circuit, is formed by ion implantation and heat diffusion in a monocrystal silicon substrate 101 for IC fabrication. The impurity is P-well if the substrate is N-sub or N-well if the substrate is P-sub [steps (a) and (b) in FIG. 3].

An oxide film 103, which is the same as that used in the formation of LOCOS, is formed (over a predetermined portion) on the impurity-diffused layer selectively by heat diffusion. Alternatively, there may be adopted a method involving formation of the oxide film over the whole surface and subsequent patterning by dry etching [step (c) in FIG. 3].

Figure 4D:
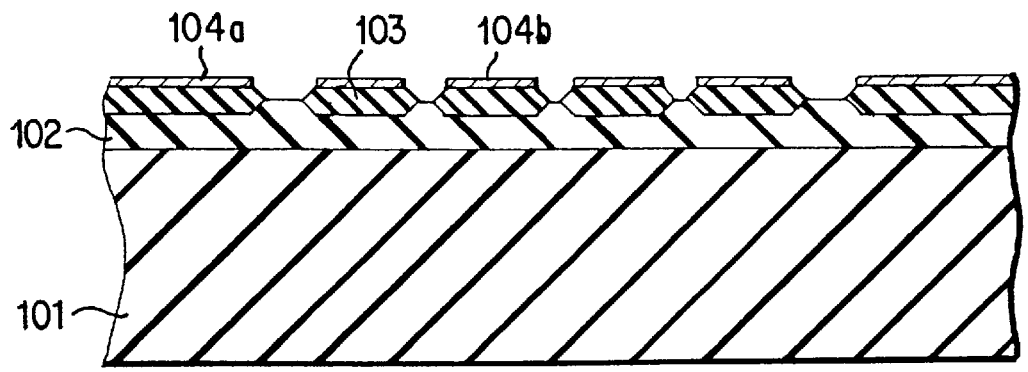
FIGS. 4(d) to 4(f) are diagrams explaining the manufacturing method for the capacitance type pressure sensor of the first embodiment.
Figure 4E:
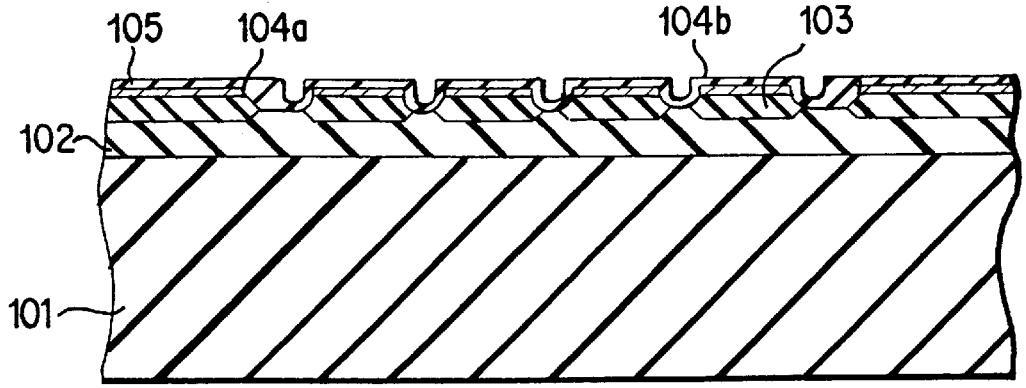
Figure 4F:
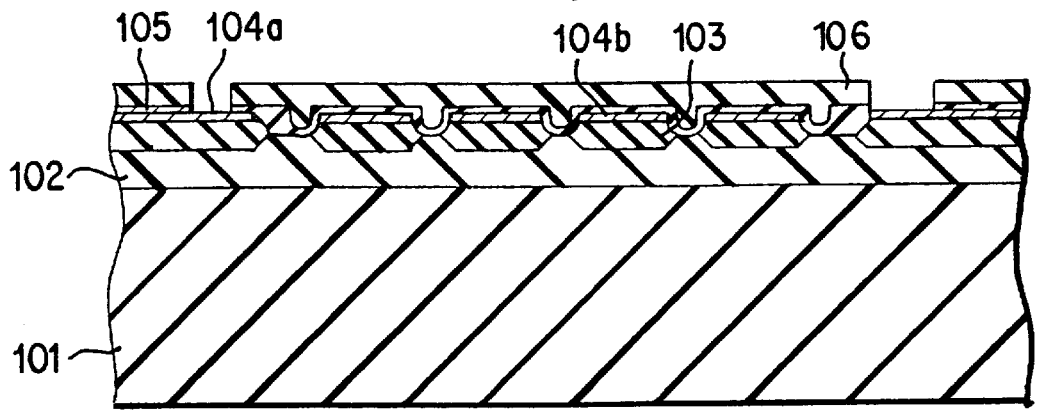

Next, in FIGS. 4(d) to 4(f), there is formed on the oxide film 103 a film of a polycrystal silicon which has been doped with an impurity for the formation of a fixed electrode wiring 104a and a movable electrode 104b, followed by patterning [step (d) in FIG. 4]. In this case, since the material of a gate electrode in a CMOS circuit (or a MOS circuit) to be described later is also the polycrystal silicon in many cases, the CMOS circuit (or MOS circuit) can also be formed integrally and simultaneously with the formation of the electrode 104b, etc.

The upper surface of the movable electrode 104b is then covered with a protective film 105 such as, for example, nitride film, followed by deposition of a sacrificial layer 106 such as, for example, oxide film or PSG film and subsequent patterning by photoetching [steps (e) and (f) in FIG. 4].

Figure 5A:
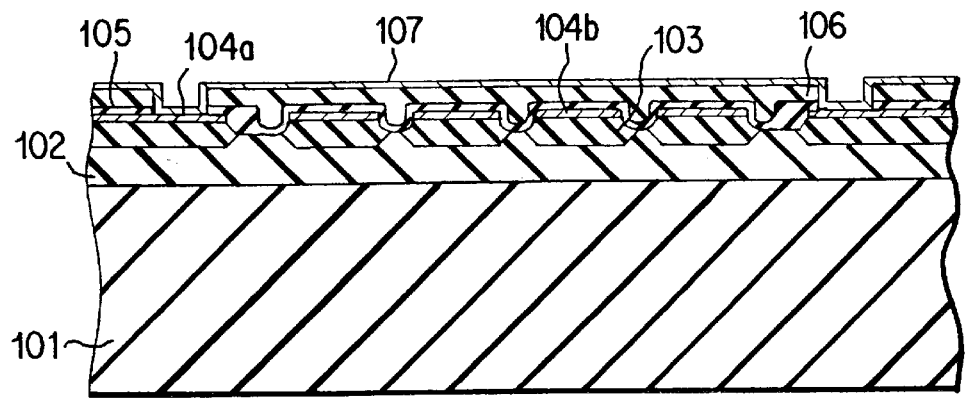
FIGS. 5(a) to 5(c) are diagrams explaining the manufacturing method for the capacitance type pressure sensor of the first embodiment.
Figure 5B:
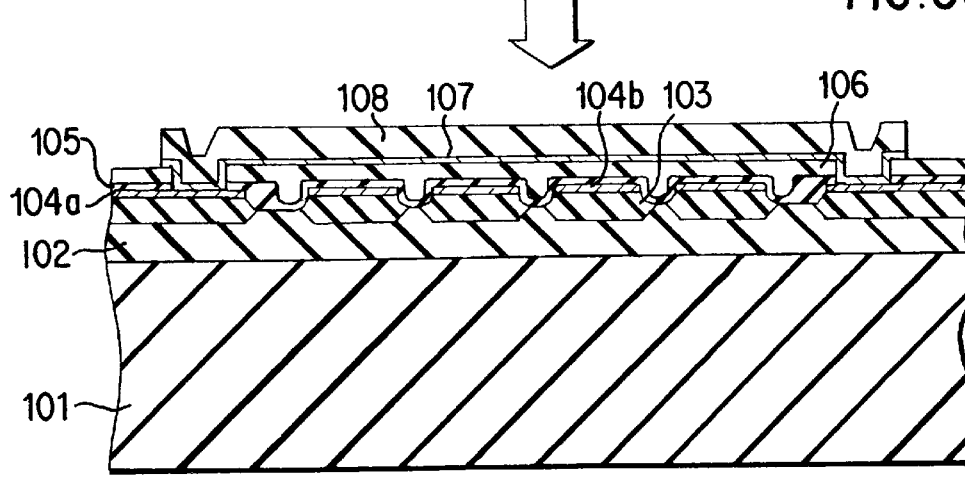
Figure 5C:
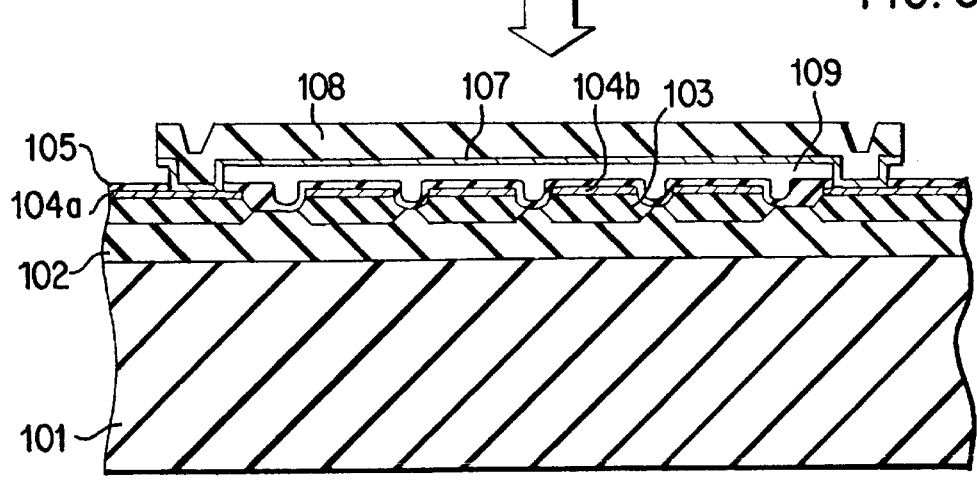

Next, in steps (a), (b) and (c) shown in FIG. 5, a polycrystal silicon film doped with an impurity for the formation of a fixed electrode 107 and a non-doped polycrystal silicon film 108 are formed by deposition and subjected to patterning.

Figure 6A:
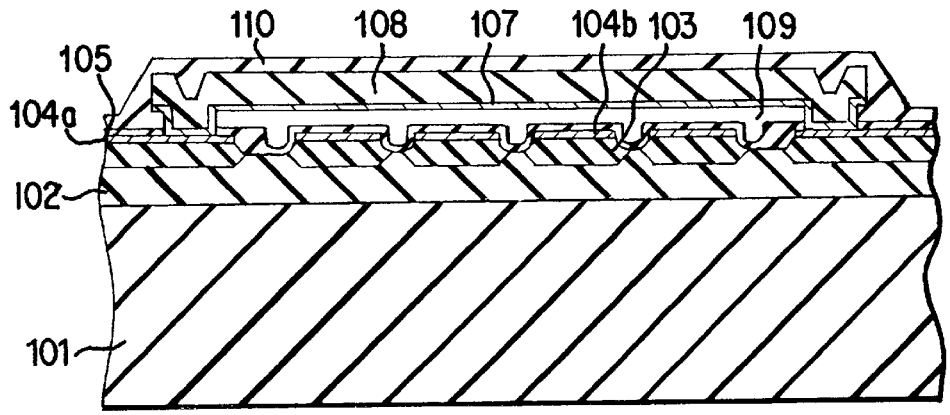
FIGS. 6(a) to 6(b) are diagrams explaining the manufacturing method for the pressure sensor of the first embodiment.
Figure 6B:
Figure 6B:
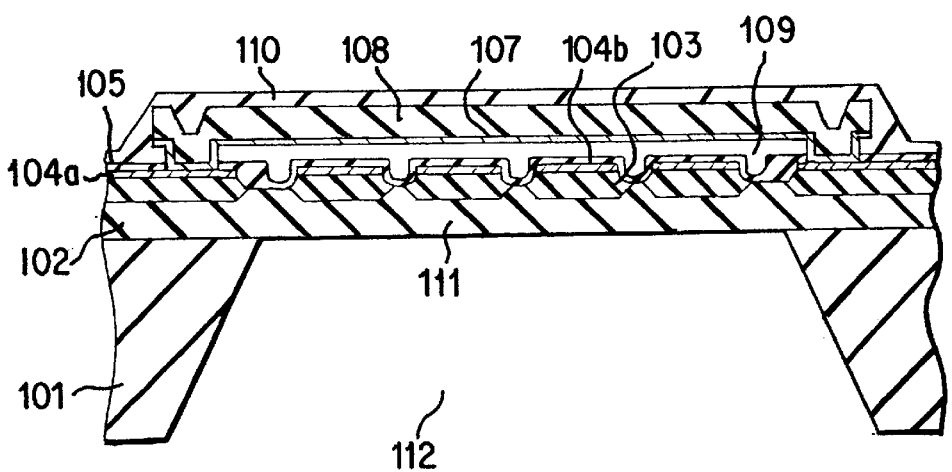

Subsequently, in FIGS. 6(a) to 6(b), the sacrificial layer is subjected to wet etching with use of hydrofluoric acid for example. Thereafter, a protective film 110 such as, for example, nitride film is formed and an anisotropic wet etching using, for example, KOH is applied to the back side of the monocrystal silicon substrate 101 [step (a) in FIG. 6]. By applying voltage between the monocrystal silicon substrate 101 and the diffused layer 102 during the etching, only the monocrystal silicon substrate 101 is etched, while the impurity-diffused layer 102 can be left unetched, whereby both diaphragm 110 and pressure inlet hole 111 can be formed at a time [step (b) in FIG. 6].

According to the above method for manufacturing the capacitance type pressure sensor of the first embodiment, the sensor can be fabricated on a single substrate integrally with a CMOS circuit (MOS circuit). Thus, the pressure sensor manufactured by this method can be small-sized, inexpensive and possess stable characteristics.

Figure 7:
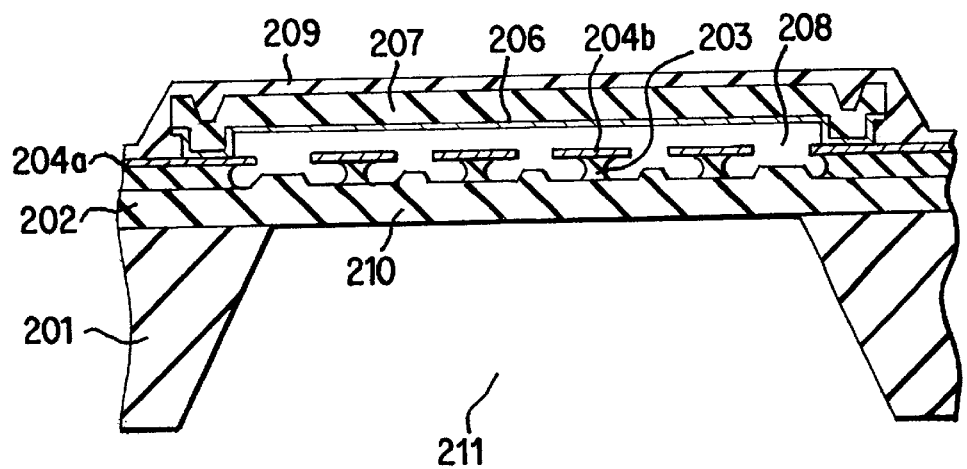
FIG. 7 is a sectional view of a capacitance type pressure sensor according to a second embodiment of the present invention.
Figure 8:
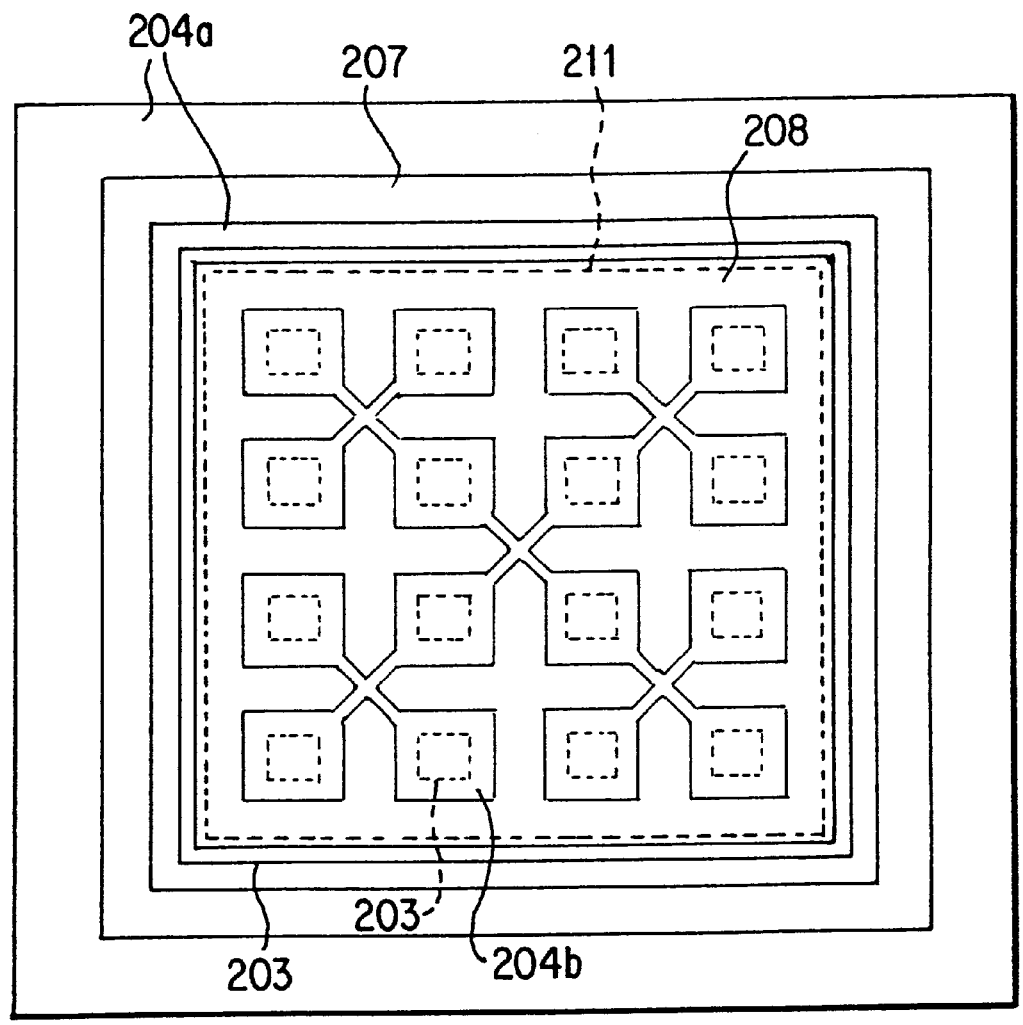
FIG. 8 is a plan view thereof.

FIG. 7 is a sectional view of a capacitance type pressure sensor according to the second embodiment of the present invention and FIG. 8 is a plan view thereof.

In FIGS. 7 and 8, the capacitance type pressure sensor of the second embodiment comprises a monocrystal silicon substrate 201, an impurity-diffused layer 202, an oxide film layer 203, a fixed electrode wiring 204a, a movable electrode 204b, a fixed electrode 206, a structure 207 for the fixed electrode, a gap 208, a protective film 209, a diaphragm 210, and a pressure inlet hole 211.

Air, which is a medium to be measured, is introduced into the pressure inlet hole 211. When the diaphragm 210 is pressurized with the air introduced into the pressure inlet hole 211, the diaphragm is displaced in accordance with the magnitude of the pressure. Upon displacement of the diaphragm 210, the gap 208, which is present between the movable electrode 204b formed on the diaphragm 210 and the fixed electrode 206, changes. That is, as a result of a change in the distance between the movable electrode 204b and the fixed electrode 206, the capacitance formed between the two electrodes changes and hence it is possible to detect the pressure. The diaphragm 210 is formed by a fragile material using an impurity-diffused monocrystal silicon.

Between the diaphragm 210 and the movable electrode 204b is formed the oxide film 203 to diminish a stray capacitance generated between the movable electrode 204b and the substrate 201 and also between the movable electrode 204b and the impurity-diffused layer 202.

Further, the oxide film 203 is divided into plural regions and the movable electrode 204b is formed thereon also as divided regions in an overhanging fashion with respect to the divided regions of the oxide film 203 so that the area of each region of the movable electrode 204b is larger than that of each region of the oxide film 203. As a result, it becomes possible to greatly diminish a stress strain induced by a difference in thermal expansion coefficient among the diaphragm 210, oxide film 203 and movable electrode 204b.

Also by the capacitance type pressure sensor of the second embodiment described above there can be attained the same effect as in the first embodiment. Besides, in the second embodiment, since the movable electrode 204b is formed in such a manner that the area of each divided region in the movable electrode 204b is larger than that of each divided region of the oxide film 203, a stress strain induced by a difference in thermal expansion coefficient among the diaphragm 210, oxide film 203 and movable electrode 204b can be diminished to a great extent.

Now, a description will be given below of a method for manufacturing the capacitance type pressure sensor of the second embodiment described above. FIGS. 9(a) to 9(c) to 12(a) to 12(b) illustrate various steps in this manufacturing method.

Figure 9A:
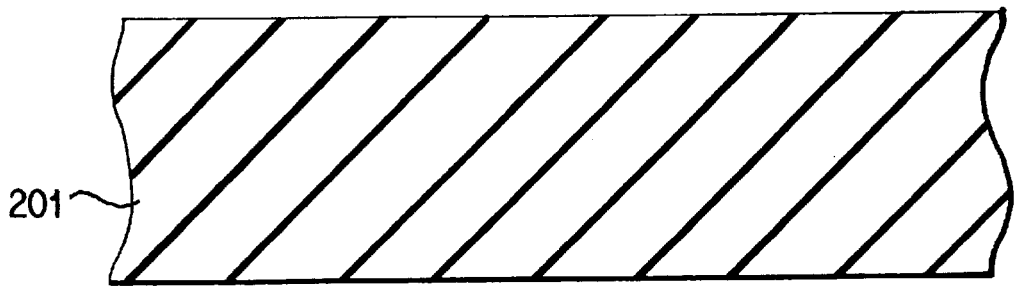
FIGS. 9(a) to 9(c) are diagrams explaining a method for manufacturing the capacitance type pressure sensor of the second embodiment.
Figure 9B:
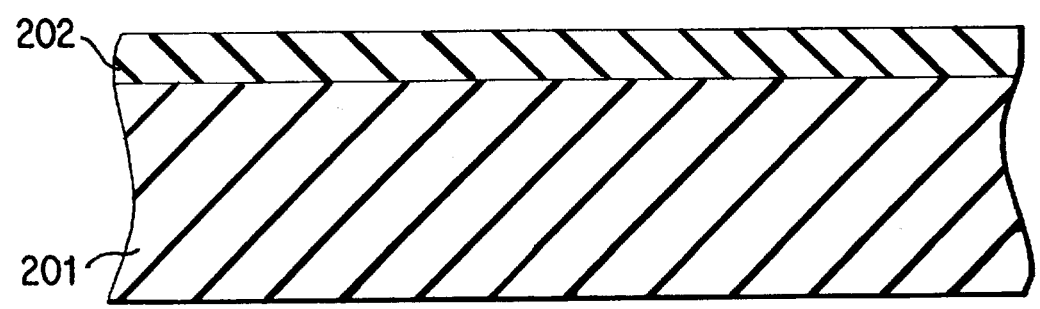
Figure 9C:
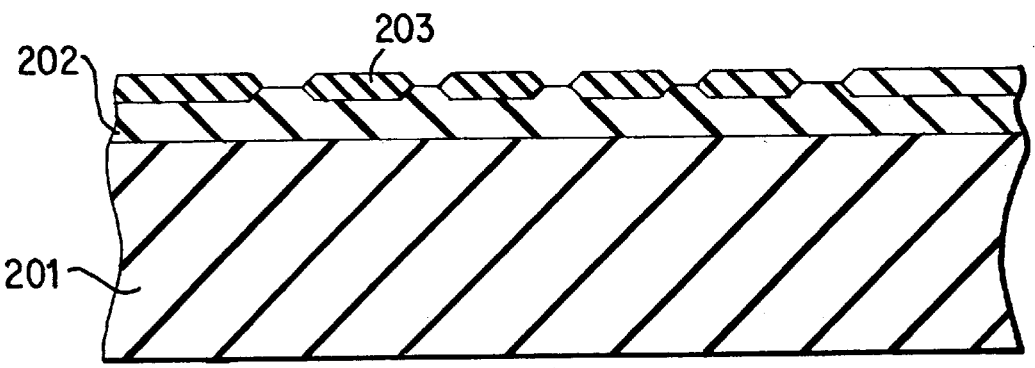

In FIGS. 9(a) to 9(c), an impurity-diffused layer 202, which is the same as that used in the formation of well for a CMOS circuit (MOS circuit), is formed by ion implantation and heat diffusion in a monocrystal silicon substrate 201 for IC fabrication. This impurity layer is P-well if the substrate is N-sub or N-well if the substrate is P-sub [steps (a) and (b) in FIG. 9].

An oxide film 203, which is the same as that used in the formation of LOCOS, is formed on the impurity-diffused layer 202 selectively by thermal oxidation [step (c) in FIG. 9]. Alternatively, there may be adopted a method involving formation of the oxide film throughout the whole surface and subsequent patterning by dry etching.

Figure 10A:
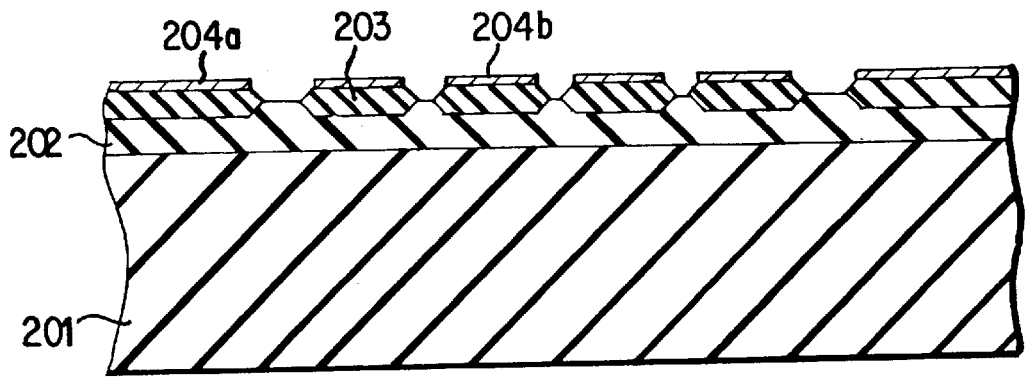
FIGS. 10(a) to 10(c) are diagrams explaining the manufacturing method for the capacitance type pressure sensor of the second embodiment.
Figure 10B:
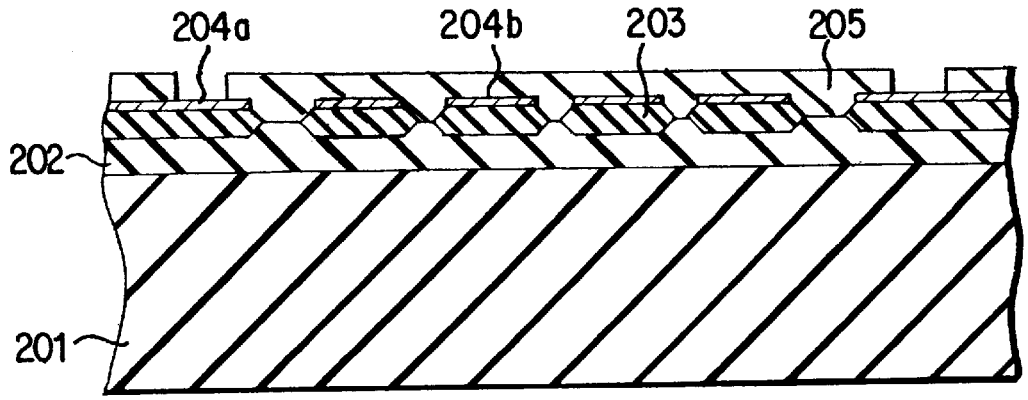
Figure 10C:
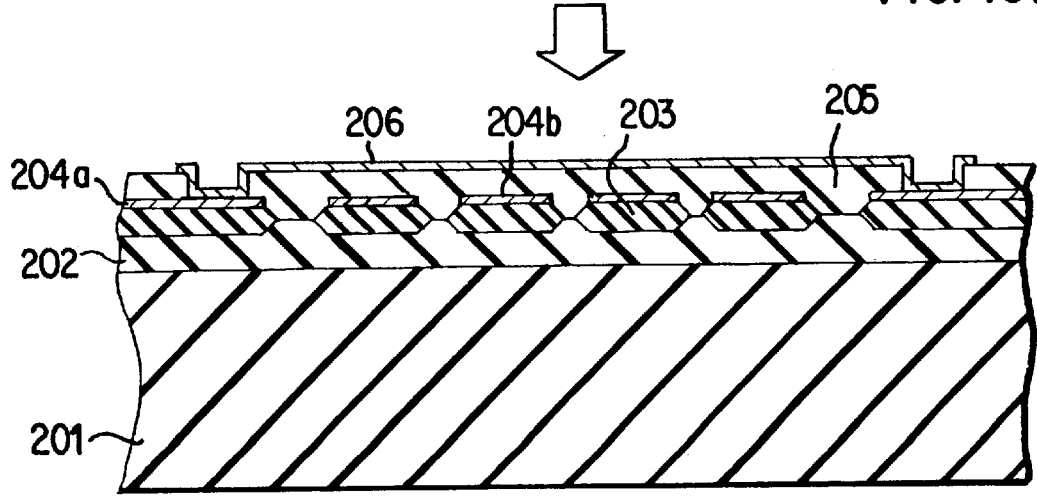

Next, in FIGS. 10(a) to 10(c) and 11(a) to 11(b), a film of a polycrystal silicon doped with impurity for the formation of a fixed electrode wiring 204a and a movable electrode 204b is formed on the oxide film 203 and then subjected to patterning [step (a) in FIG. 10].

Next, a sacrificial layer 205 such as, for example, oxide film or PSG film is formed on both fixed electrode wiring 204a and movable electrode 204b by deposition and then patterning is performed by photoetching [step (b) in FIG. 10].

Figure 11A:
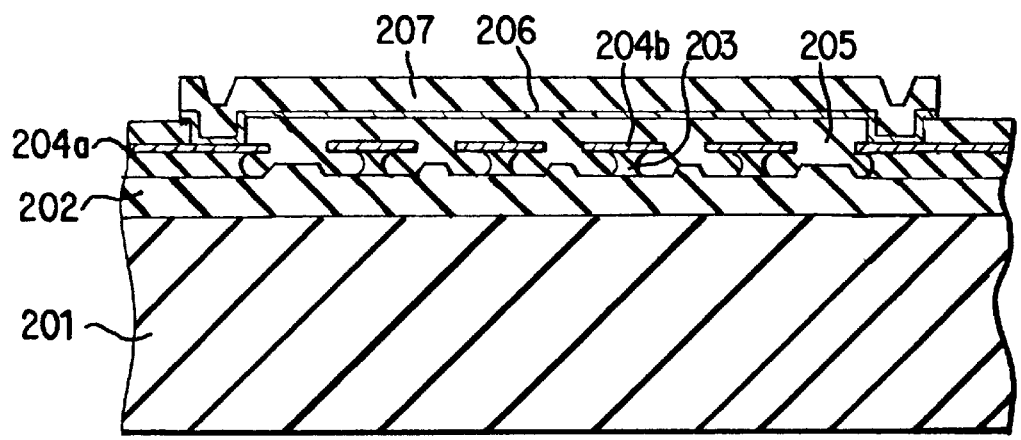
FIGS. 11(a) to 11(b) are diagrams explaining the manufacturing method for the capacitance type pressure sensor of the second embodiment.
Figure 11B:
Figure 11B:
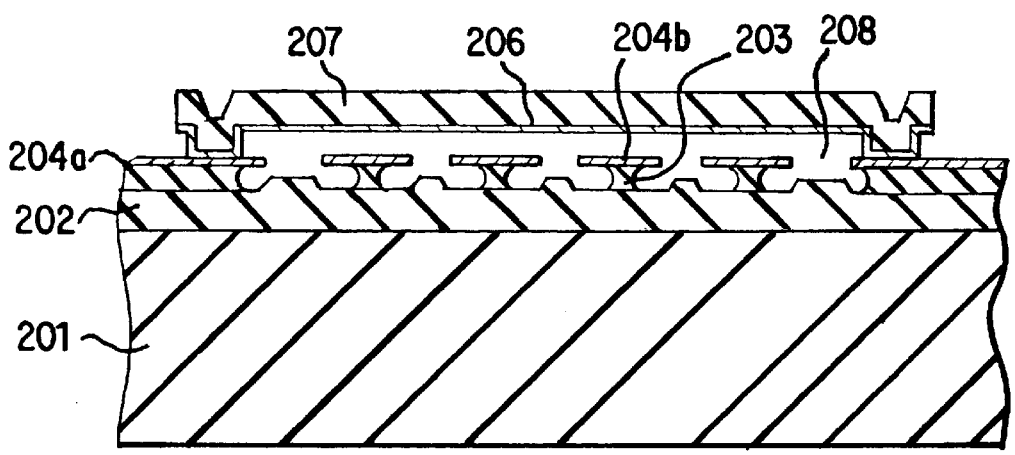

Thereafter, a polycrystal silicon film doped with impurity for a fixed electrode 206 and a non-doped polycrystal silicon film 207 are formed by deposition and then subjected to patterning [step (c) in FIG. 10 and step (a) in FIG. 11].

Next, the sacrificial layer 205 and the oxide film 203 are partially subjected to wet etching with use of hydrofluoric acid for example [step (c) in FIG. 11].

Figure 12A:
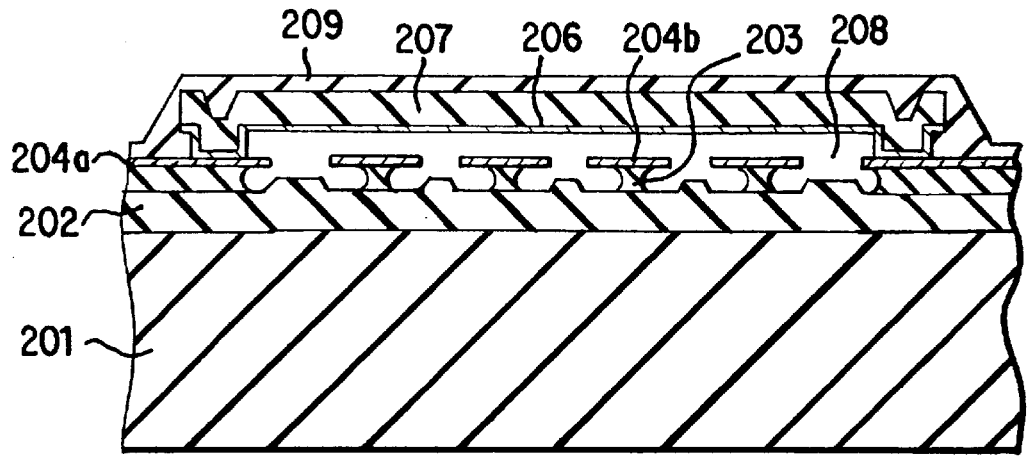
FIGS. 12(a) to 12(b) are diagrams explaining the manufacturing method for the capacitance type pressure sensor of the second embodiment.
Figure 12B:
Figure 12B:
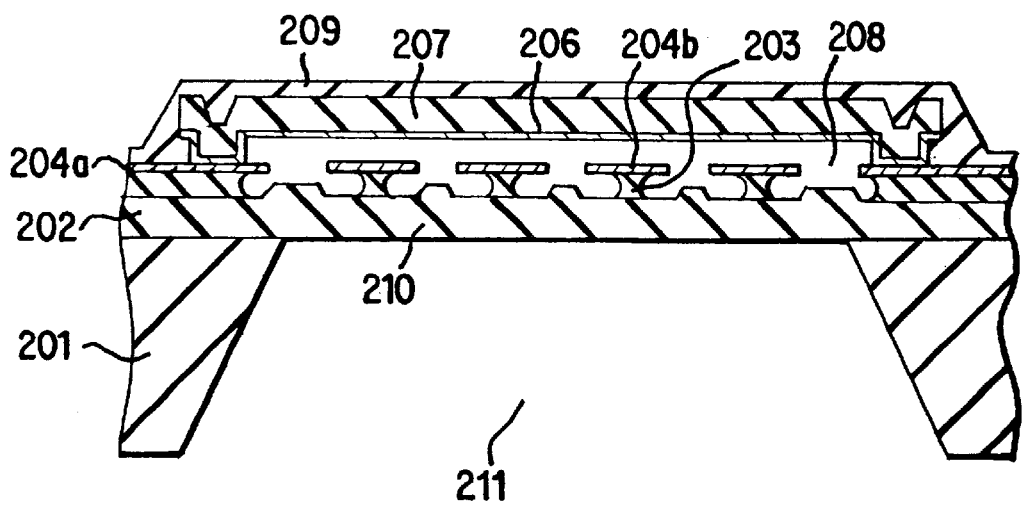

Subsequently, in FIGS. 12(a) to 12(b), a protective film 209 such as, for example, nitride film is formed on the polycrystal silicon film 207 [step (a) in FIG. 12], and wet etching is performed using, for example, KOH from the back side of the monocrystal silicon substrate 201 [step (b) in FIG. 12]. By applying voltage between the monocrystal silicon substrate 201 and the impurity diffused layer 202 during the etching, only the silicon substrate 201 is etched, while the impurity-diffused layer 202 can be left unetched.

As a result, it is possible to form both diaphragm 210 and pressure inlet hole 211 at a time.

According to the above method for manufacturing the capacitance type pressure sensor of the second embodiment, the sensor can be fabricated on a single substrate integrally with a CMOS circuit and it can be small-sized, inexpensive and possess stable characteristics.

Figure 13:
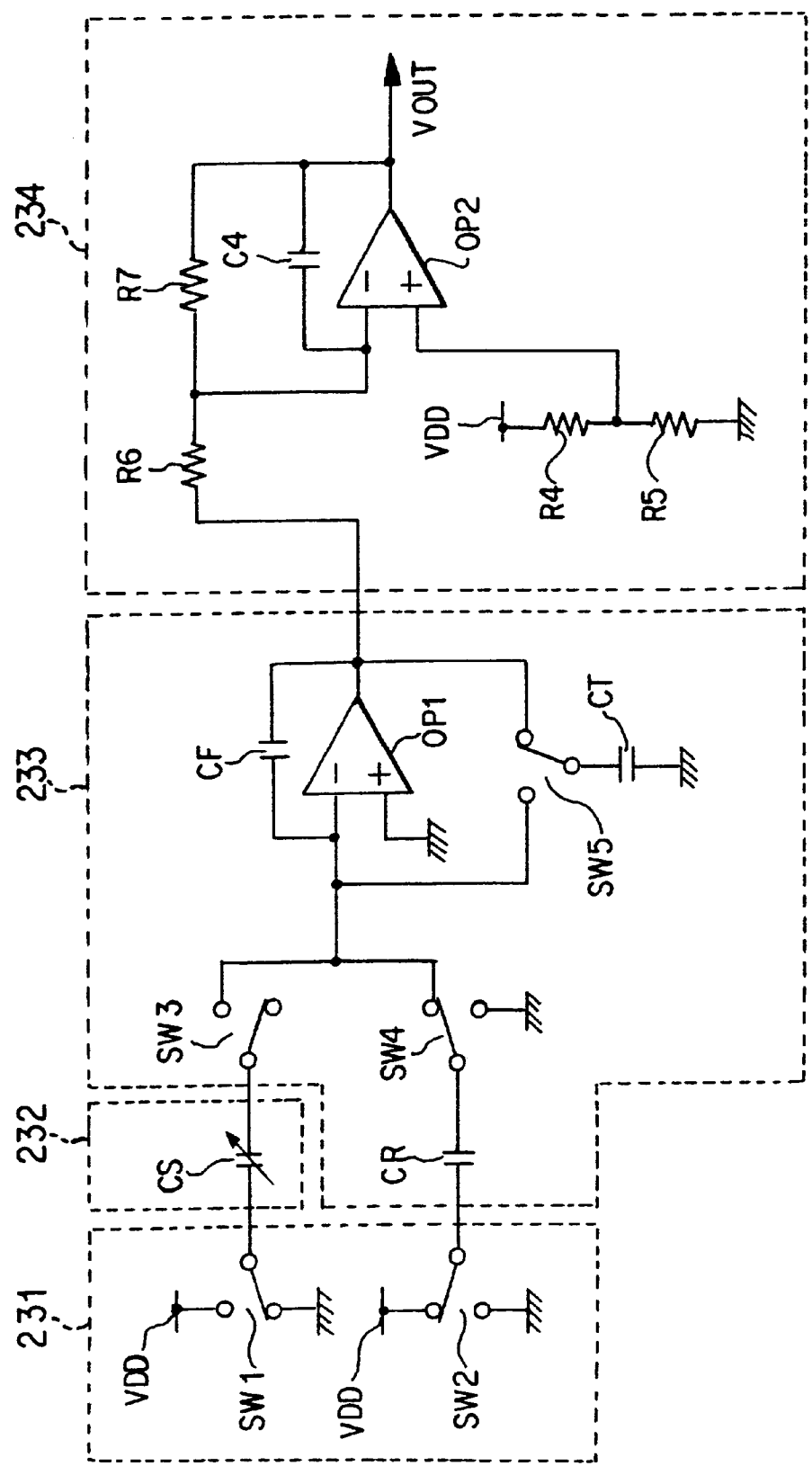
FIG. 13 is a block diagram of a signal processing circuit applied to the capacitance type pressure sensor of the present invention.

FIG. 13 is a block diagram of a signal processing circuit applied to the processing of an output signal, etc. provided from the capacitance type pressure sensor according to the present invention.

In FIG. 13, the signal processing circuit comprises a signal applying section 231, a pressure detecting section 232, a capacitance detecting section 233, and an output regulating section 234.

The signal applying section 231 is provided with a power supply VDD and analog switches SW1 and SW2. The pressure detecting section 232 is constituted by one capacitor CS, which capacitor serves as a pressure sensing element formed by both movable electrode (104b, 204b) and fixed electrode (107, 206) described above.

The capacitance detecting section 233 comprises analog switches SW3, SW4, SW5, an operational amplifier OP1 and capacitor CR, CT, CF. The output regulating section 234 comprises a power supply VDD, an operational amplifier OP2, resistors R4, R5, R6, R7 and a capacitor C4.

The signal applying section 231, pressure detecting section 232 and capacitance detecting section 233 are each of a switched capacitor circuit configuration, from which is obtained an output proportional to a capacitance value by ON-OFF operation of each switch. Assuming that the output voltage of the capacitance detecting section 233 (output of OP1) is Vo, the operation of this circuit is represented by the following equation (1), where the CF, CT, CS and CR stand for capacitance values of capacitors CF, CT, CS and CR, respectively:

$$CF \cdot Vo(n) = CF \cdot Vo(n-1) - CT \cdot Vo(n-1) - CS \cdot VDD + CR \cdot VDD \quad (1)$$

Finally, the following equation (2) is attained:

$$Vo = [(CR-CS)/CF] \cdot VDD \quad (2)$$

Therefore, when the capacitance value of the capacitor CS changes upon application of pressure to the pressure sensing element, this change in the capacitance value can be converted to a voltage output.

This output voltage is regulated to predetermined offset voltage and sensitivity by the output regulating section 234.

With this circuit configuration, a pressure signal can be converted to a voltage signal in a relatively easy manner.

The above signal processing circuit is constituted by a CMOS circuit, and if the gate electrode in this CMOS circuit is formed by a polycrystal silicon, it is possible to form the CMOS circuit and the pressure sensor body integrally by molding.

Figure 14:
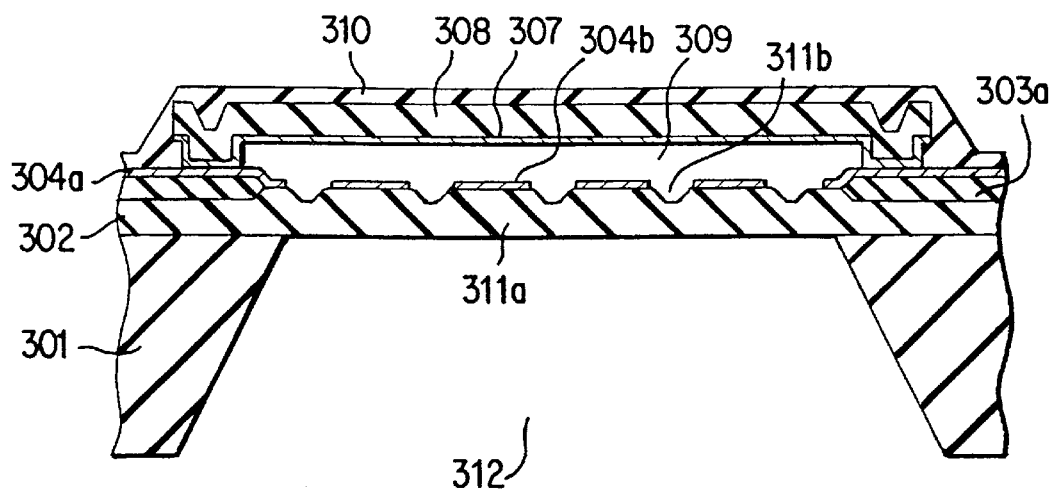
FIG. 14 is a sectional view of a capacitance type pressure sensor according to a third embodiment of the present invention.
Figure 15:
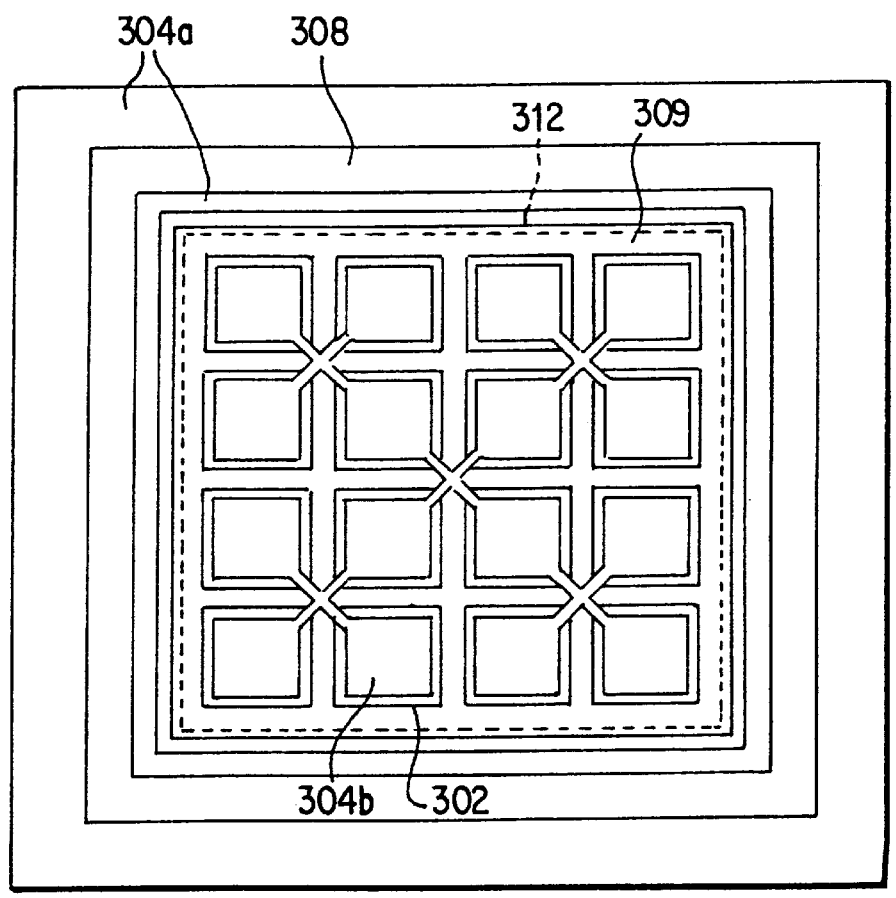
FIG. 15 is a plan view thereof.

FIG. 14 is a sectional view of a capacitance type pressure sensor according to the third embodiment of the present invention and FIG. 15 is a plan view thereof.

In FIGS. 14 and 15, the capacitance type pressure sensor of the third embodiment comprises a monocrystal silicon substrate 301, an impurity-diffused layer 302, an oxide film layer 303a, a fixed electrode wiring 304a, a movable electrode 304b, a fixed electrode 307, a structure 308 for the fixed electrode, a gap 309, a protective film 310, a diaphragm 311a, a trench 311b, and a pressure inlet hole 312.

When air, which is a medium to be measured, is introduced into the pressure inlet hole 312 and pressurizes the diaphragm 311a, the diaphragm 311a is displaced in accordance with the magnitude of the applied pressure. As a result, the gap 309, which is present between the movable electrode 304b formed on the diaphragm 311a and the fixed electrode 307, changes, so that the capacitance formed between the two electrodes changes, thus permitting detection of the pressure.

Since the diaphragm 311a is formed using an impurity-diffused monocrystal silicon which is a fragile material, it constitutes a highly reliable and stable pressure-responsive structure without undergoing an plastic deformation.

Since the trench 311b is formed in a minutely divided manner in the substrate 301 and the movable electrode 304b is formed on only the upper surface portion of the diaphragm 311a other than portions of the divided trenches 311b, it is possible to diminish a stress strain generated by a difference in thermal expansion coefficient between the diaphragm 311a and the movable electrode 304b.

Further, since the upper surface portion of the fixed electrode 307 is completely covered with the structure 308 for the fixed electrode which structure is formed by an insulating polycrystal silicon film not doped with impurity, not only the rigidity of the fixed electrode 307 is enhanced but also leak current is diminished.

Thus, according to the capacitance type pressure sensor of the third embodiment, the diaphragm 311a is formed by a fragile material using an impurity-diffused monocrystal silicon, and the movable electrode 304b is divided into plural regions. Besides, the upper surface of the fixed electrode 307 is covered with the structure 308 for the fixed electrode which structure is formed using a polycrystal silicon film not doped with impurity.

Therefore, the pressure-responsive structure is stable and the capacitance type pressure sensor is highly accurate and reliable with little deformation caused by a thermal strain and little leak current.

The following description is now provided about a method for manufacturing the capacitance type pressure sensor of the third embodiment. FIGS. 16(a) to 16(c) to 19(a) to 19(b) illustrate various steps in the said method.

Figure 16A:
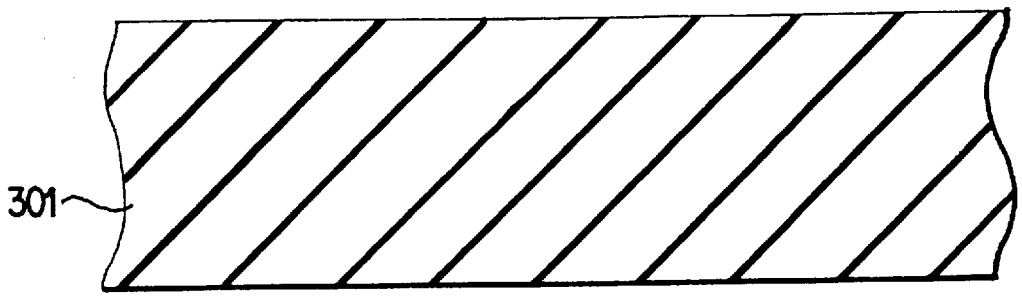
FIGS. 16(a) to 16(c) are diagrams explaining a method for manufacturing the capacitance type pressure sensor of the third embodiment.
Figure 16B:
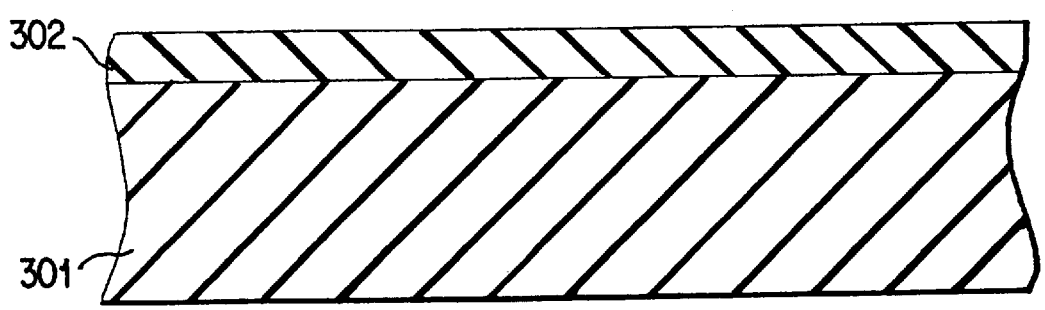
Figure 16C:
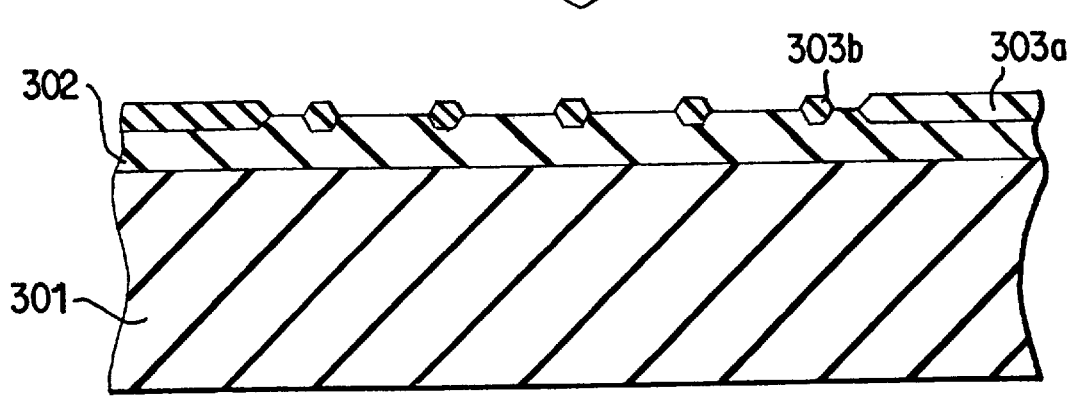

In FIGS. 16(a) to 16(c), an impurity-diffused layer 302, which is the same as that used in the formation of well for a CMOS circuit, is formed by ion implantation and heat diffusion in a monocrystal silicon substrate 301 for IC fabrication [steps (a) and (b) in FIG. 16]. This impurity is P-well if the substrate is N-sub or N-well if the substrate is P-sub.

Oxide films 303a and 303b, which are the same as in the formation of LOCOS, are formed on the impurity-diffused layer 302 selectively by thermal oxidation [step (c) in FIG. 16]. Alternatively, there may be adopted a method involving formation of the oxide films throughout the whole surface and subsequent patterning by dry etching.

Figure 17A:
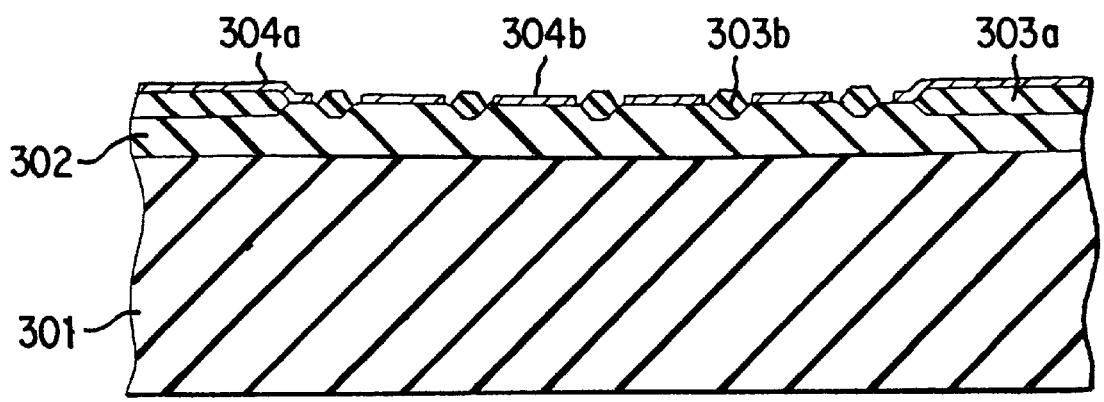
FIGS. 17(a) to 17(c) are diagrams explaining the manufacturing method for the capacitance type pressure sensor of the third embodiment.
Figure 17B:
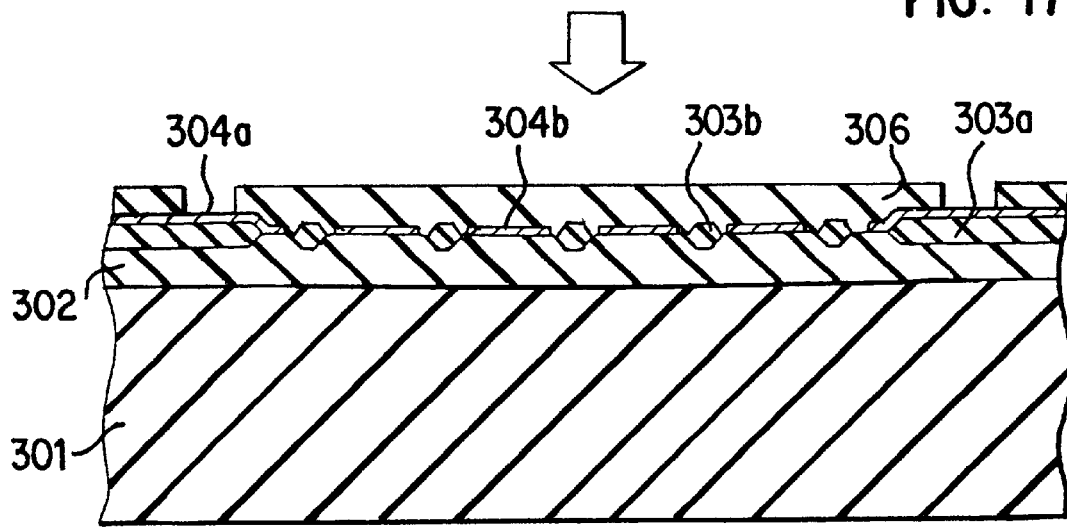
Figure 17C:
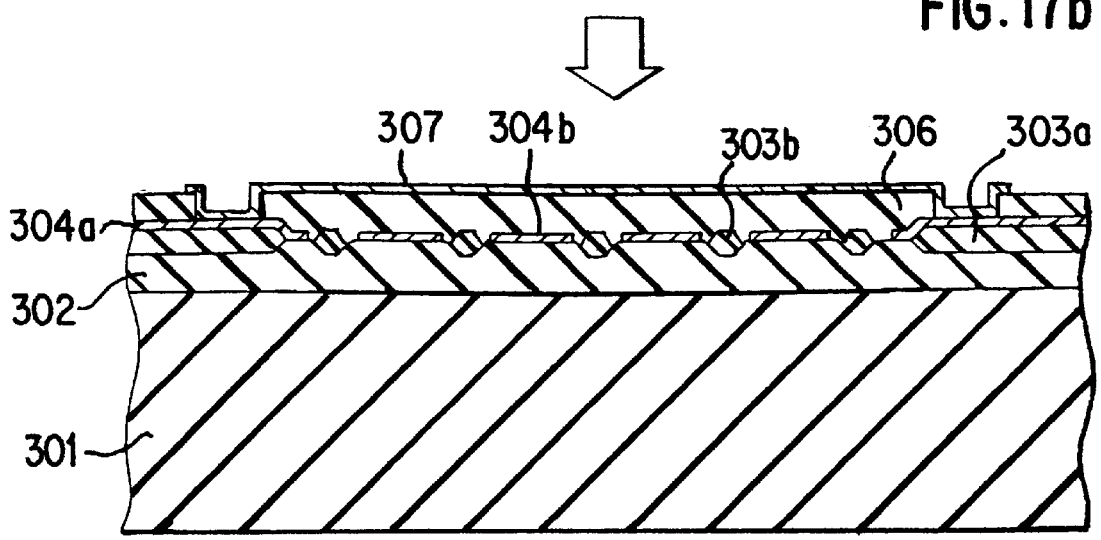

Next, in FIGS. 17(a) to 17(c), a film of a polycrystal silicon doped with impurity for forming a fixed electrode wiring 304a and a movable electrode 304b is formed on the oxide film 303a and the impurity-diffused layer 302, followed by patterning [step (a) in FIG. 17].

Then, a sacrificial layer 306 such as, for example, oxide film or PSG film is formed on the movable electrode 304b by deposition and is subjected to patterning by photoetching [step (b) in FIG. 17].

Figure 18A:
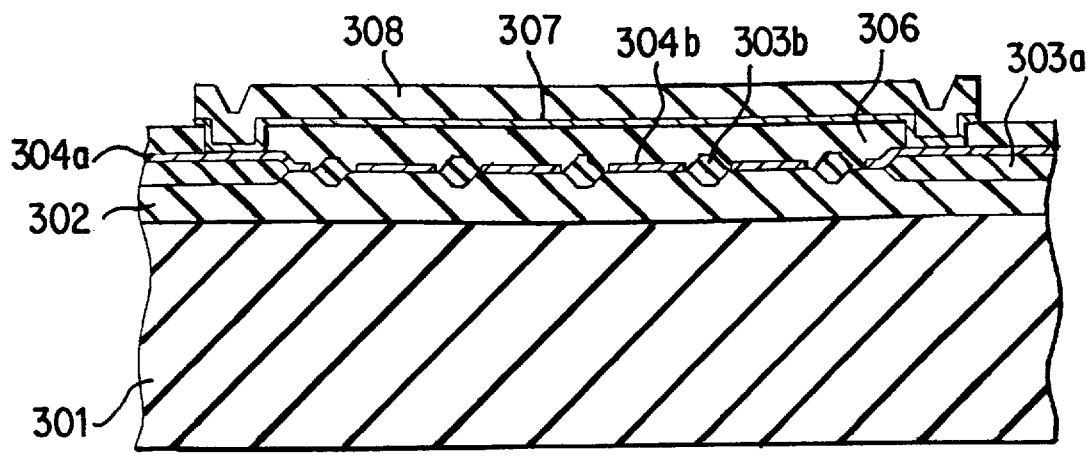
FIGS. 18(a) to 18(b) are diagrams explaining the manufacturing method for the pressure sensor of the third embodiment.
Figure 18:
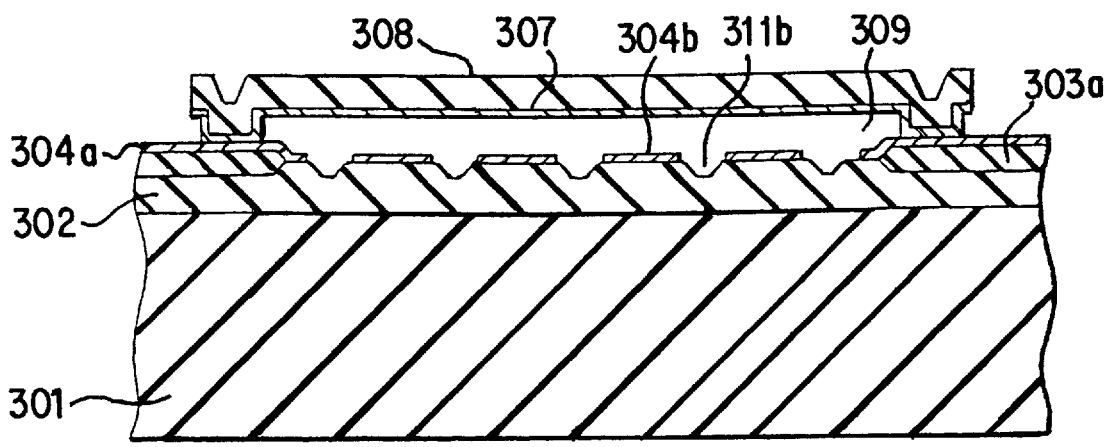

Thereafter, a polycrystal silicon film doped with impurity for the formation of a fixed electrode 307 and a non-doped polycrystal silicon film 308 are formed by deposition, followed by patterning [step (c) in FIG. 17 and step (a) in FIG. 18].

Figure 19A:
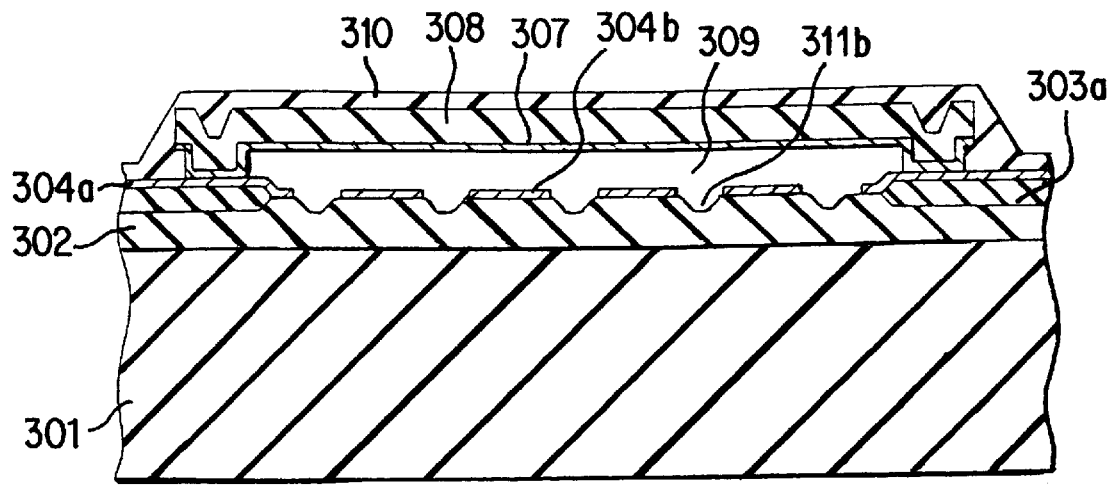
FIGS. 19(a) to 19(b) are diagrams explaining the manufacturing method for the pressure sensor of the third embodiment.
Figure 19B:
Figure 19B:
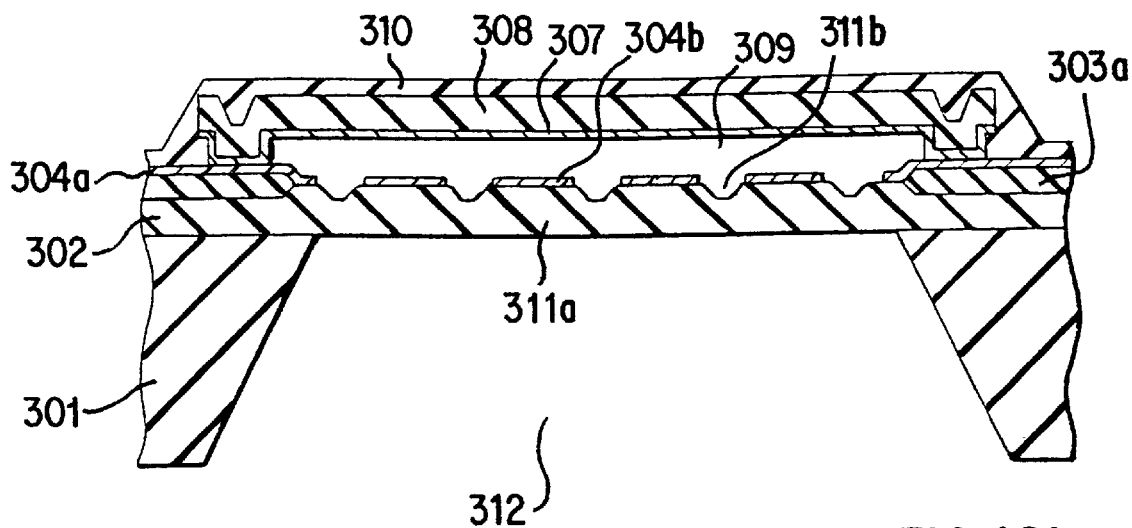

Subsequently, the sacrificial layer 306 and the oxide film 303b are subjected to wet etching with hydrofluoric acid, for example, whereby a gap 309 and a trench 311b are formed at a time [step (b) in FIG. 18]. Then, a protective film 310 such as, for example, nitride film is formed [step (a) in FIG. 19], and an anisotropic wet etching using KOH for example is performed from the back side of the monocrystal silicon substrate 301 [step (b) in FIG. 19].

By applying voltage between the monocrystal silicon substrate 301 and the impurity-diffused layer 302 during the etching, only the substrate 301 is etched, while the impurity-diffused layer 302 can be left unetched.

In this way both diaphragm 311a and pressure inlet hole 312 can be formed simultaneously.

According to the above method for manufacturing the capacitance type pressure sensor of the third embodiment, the pressure sensor can be fabricated on a single substrate integrally with a CMOS circuit and it can be small-sized, inexpensive and possess stable characteristics.

Although in the above embodiments the movable electrodes (104b, 204b, 304b) and oxide films (103, 203) are each divided into sixteen regions, the number of division is not limited to sixteen. Any number of division may be adopted, provided it is not smaller than two and brings about a strain diminishing effect matching the specification required.

Although the capacitance type pressure sensor according to the present invention is suitable for use in controlling an automotive engine, the object of application is not limited to automobiles, but the pressure sensor is also applicable to other objects to be pressure detected.

Now that the embodiments of the present invention are constructed as above, there are attained the following effects.

Since the diaphragm is formed by a fragile material using an impurity-diffused monocrystal silicon and an oxide film is formed between the movable electrode and the diaphragm, a stray capacitance is diminished and it is possible to realize a capacitance type pressure sensor capable of detecting pressure with a high accuracy.

If the movable electrode and the oxide film are each divided into plural regions, it is possible to diminish a stress strain induced by a difference in thermal expansion coefficient among the diaphragm, oxide film and movable electrode, and it is possible to afford a capacitance type pressure sensor capable of detecting pressure with a high accuracy.

If the upper surface of the fixed electrode is covered with a structure for the fixed electrode which structure is formed by an insulating polycrystal silicon film not doped with impurity, it is possible to afford a highly accurate and reliable capacitance type pressure sensor with little deformation caused by a thermal strain and with little leak current.

Moreover, it is possible to realize a capacitance type pressure sensor having stable characteristics difficult to undergo a strain caused by an intrinsic stress in thermal stress film formation, without any plastic deformation of a pressure bearing structure.

Further, since the capacitance type pressure sensor manufacturing method according to the present invention permits the use of a conventional IC manufacturing process, it is possible to form the pressure sensor on a single chip together with a circuit portion and hence possible to reduce both size and cost.

What is claimed is:

1. A capacitance type pressure sensor comprising:

a diaphragm which is a monocrystal silicon substrate and which is displaced by applied pressure;

an insulating film formed on said diaphragm;

a first electrode formed on said insulating film;

a second electrode formed in opposition to said first electrode through a gap; and means for detecting a change in capacitance between said first and second electrodes and converting the detected capacitance change into a voltage, which capacitance change occurs due to a change in the distance between said first and second electrodes caused by the pressure applied to said diaphragm.

2. A capacitance type pressure sensor according to claim 1, wherein said insulating film is divided in at least two parts.

3. A capacitance type pressure sensor according to claim 2, wherein said first electrode is divided in at least two parts.

4. A capacitance type pressure sensor according to claim 3, wherein the area of said first electrode is smaller than the area of said insulating film.

5. A capacitance type pressure sensor according to claim 1, wherein a hollow portion is present partially between said first electrode and said silicon substrate.

6. A capacitance type pressure sensor according to claim 1, wherein said first electrode is formed by a polycrystal silicon.

7. A capacitance type pressure sensor according to claim 1, which is integral with a signal processing circuit for processing a signal provided from the pressure sensor and wherein the material of a gate electrode of a MOS transistor included in said signal processing circuit is the same as the material of said first electrode.

8. A capacitance type pressure sensor comprising:

a diaphragm which is a monocrystal silicon substrate and which is displaced by applied pressure;

a first electrode formed on said diaphragm and divided in at least two or more parts;

a second electrode formed in opposition to said first electrode through a gap; and means for detecting a change in capacitance between said first and second electrodes and converting the detected capacitance change into a voltage, which capacitance change occurs due to a change in the distance between said first and second electrodes caused by the pressure applied to said diaphragm.

9. A capacitance type pressure sensor according to claim 8, wherein said first electrode is formed by a polycrystal silicon.

10. A capacitance type pressure sensor according to claim 8, which is integral with a signal processing circuit for processing a signal provided from the pressure sensor and wherein the material of a gate electrode of a MOS transistor included in said signal processing circuit is the same as the material of said first electrode.

* * * * *